US009579777B2

(12) United States Patent
Chen et al.

(10) Patent No.: US 9,579,777 B2
(45) Date of Patent: Feb. 28, 2017

(54) IMPACT TYPE FASTENING TOOL AND CONTROL METHOD THEREOF

(71) Applicant: CHERVON (HK) LIMITED, Wanchai (HK)

(72) Inventors: Wu Chen, Nanjing (CN); Liang Chen, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 292 days.

(21) Appl. No.: 14/296,669

(22) Filed: Jun. 5, 2014

(65) Prior Publication Data

US 2014/0365012 A1 Dec. 11, 2014

(30) Foreign Application Priority Data

Jun. 9, 2013 (CN) .......................... 2013 1 0230586

(51) Int. Cl.
*G05B 15/02* (2006.01)
*B25B 21/02* (2006.01)

(52) U.S. Cl.
CPC .................................. *B25B 21/02* (2013.01)

(58) Field of Classification Search
CPC ..................................................... B25B 21/02
USPC .............................................. 318/3, 34, 139
See application file for complete search history.

(56) References Cited

U.S. PATENT DOCUMENTS

| | | | | |
|---|---|---|---|---|
| 6,262,560 B1 * | 7/2001 | Lionberg | H02J 7/0054 | 307/48 |
| 7,521,892 B2 * | 4/2009 | Funabashi | H01M 2/1022 | 320/114 |
| 7,825,615 B2 * | 11/2010 | Chen | H01M 10/44 | 318/139 |
| 8,292,002 B2 * | 10/2012 | Baumann | B25D 17/24 | 173/109 |

* cited by examiner

*Primary Examiner* — David S Luo
(74) *Attorney, Agent, or Firm* — Greenberg Traurig, LLP

(57) ABSTRACT

An impact type fastening tool, has a housing, a motor received in the housing, a main switch for controlling ON and OFF operations of the motor, an impact mechanism connected to the motor, and a control device. The control device comprises a current detecting module and a main control module connected to the current detecting module. The main control module can judge whether the impact mechanism performs an impact according to the signal detected by the current detecting module and control the motor to automatically stop in a preset time period after the impact mechanism performs an impact.

12 Claims, 7 Drawing Sheets

Schematic View of Working Current of the Impact Tool

IMPACT TYPE FASTENING TOOL AND CONTROL METHOD THEREOF

RELATED APPLICATION INFORMATION

This application claims the benefit of CN 201310230586.6, filed on Jun. 9, 2013, the disclosure of which is incorporated herein by reference in its entirety.

FIELD OF THE DISCLOSURE

The subject disclosure generally relates to fastening tools and, more particularly, to an impact type fastening tool having a discontinuous impact function.

BACKGROUND

Currently, impact type fastening tools, such as impact screwdrivers, generally perform a striking operation through use of continuous impacting motions. However, in some operating conditions, when a strike needs to be applied one more time after a screw is positioned flush with a surface of a workpiece or when pretension needs to be increased after a bolt is tightened, upon using an ordinary impact type tool, a user needs to control output and cut-off of the impact by controlling a trigger by himself, whereupon manual control of impact time usually damages the surface of the workpiece or causes damage by applying excessive pretension to the bolt due to error of the control time, which imposes very high requirements for the user's operation and causes trouble during operation.

With respect to the above problem, some solutions are proposed, for example, a motor is automatically stopped upon detecting the times of impact reaching a preset value; or the motor is stopped by using a sensor to detect and judge whether impact occurs and depending on whether an ON state and operation duration of a main switch exceeds a predetermined duration after the impact of the first time. However, these methods require precise detection and judgment of impact times or the impact of the first time, so an additional sensor needs to be positioned nearby an impact swing block to detect the swing block, thereby making the structure more complicated and causing the cost of the impact type fastening tool to be too high.

SUMMARY

In view of the above, the following describes an impact type fastening tool which exhibits a simple structure, is less costly to manufacture, and can effectively prevent damages to the surface of the workpiece or a fastener, and a control method thereof.

To this end, an impact type fastening tool is described which comprises a housing, a motor received in the housing, a main switch for controlling ON and OFF operations of the motor, an impact mechanism connected to the motor, and a control device. An operation procedure of the impact type fastening tool comprises a starting-up phase and a started or operational phase, wherein the started phase comprises a non-impact phase and an impact phase. The control device comprises a current detecting module and a main control module connected to the current detecting module, wherein the main control module is able to judge whether the impact mechanism performs an impact according to the signal detected by the current detecting module and control the motor to automatically stop in a preset time period after the impact mechanism performs the impact.

Furthermore, the impact type fastening tool may comprise a mode selection element, and the control device may further comprises a mode selection element state detecting module connected to a main control module, and the mode selection element has a first state and a second state. The mode selection element state detecting module is configured to detect a state of the mode selection element. When the mode selection element is in the first state, the impact type fastening tool is operated in a continuous impact mode in which the main control module is able to control the motor to stop when the main switch is released; and when the mode selection element is in the second state, the impact type fastening tool is operated in a discontinuous impact mode and the main control module is able to control the motor to automatically stop in the preset time period after the impact mechanism performs the impact.

Furthermore, the current detection module may comprise a starting-up detection module for detecting the starting-up state, and the main control module is able to judge whether the impact type fastening tool completes the starting-up operation according to the signal detected by the starting-up detection module.

Furthermore, the current detection module may further comprise an impact detection module for detecting an impact state after the impact type fastening tool completes the starting-up operation, and the main control module is able to judge whether the impact mechanism performs the impact according to the signal detected by the impact detection module.

Furthermore, the impact detection module is preferably able to detect the current signal of the motor, and the main control module is preferably able to judge whether the impact mechanism performs the impact according to the change of the current signal detected by the impact detection module.

Also described is a control method for an impact type fastening tool having a housing, a motor received in the housing, a main switch for controlling ON and OFF operations of the motor, an impact mechanism connected to the motor and a control device. The control device comprises a main control module, a starting-up detection module and an impact detection module respectively connected to the main control module. The impact detection module is able to detect the current signal of the motor. The control method comprises the following steps:

a starting-up detecting and judging step for judging whether the impact type fastening tool completes a starting-up operation according to the signal detected by the starting-up detection module;

an impact detecting and judging step for judging whether the impact mechanism performs an impact according to the current signal detected by the impact detection module after the starting-up operation is completed; and a step for controlling the motor to stop the operation, in which the main control module controls the motor to automatically stop the operation in a preset time period after the impact occurs.

Furthermore, the starting-up detecting and judging step may be implemented in the following manner: a step for detecting a variation value of a travel of the main switch per unit time is executed; if the variation value is greater than a preset value L0, it is judged that the tool is in the starting-up phase and the step for detect the variation value of the travel of the main switch per unit time is executed again; and if the variation value is smaller than the preset value L0, a step for detecting a current flowing through the motor is executed: if the detected current is smaller than a preset value I0, it is judged that the starting-up phase is completed; and if the detected current is greater than the preset value I0, it is believed that the starting-up phase will be completed after a delay of the preset time period.

Furthermore, the preset value L0 is preferably a preset value of the travel variation of the main switch per unit time; after the amount of the travel of the main switch is sampled through AD conversion, the number of digits in a corresponding program is set, and the preset value of the travel variation of the main switch per unit time is a preset value of the number variation of the digits in the program per unit time. The preset value I0 is preferably a current preset value, and the preset value I0 is arranged between a maximum current value after the impact occurs and a current peak in the starting-up phase.

Furthermore, the impact detecting and judging step may comprise: a current detecting step for detecting a current variation value of the motor per unit time; an impact judging step for judging that the tool is in an impact phase when the current is greater than a preset value K0, and judging that the tool is in a non-impact phase when the current is smaller than the preset value K0, and continuing to detect the current variation value per unit time.

Furthermore, the preset value K0 is preferably a preset value of the current variation per unit time, and the preset value K0 is arranged between the current variation value per unit time in the non-impact phase and the current variation value per unit time in the impact phase.

Furthermore, the impact type fastening tool may further comprise a stage setting element for selecting the output stage of the tool; and before executing the current detecting step, a step for judging the preset value K0 may be executed to detect the stage set by the stage setting element and select a corresponding preset valve K0 according to the stage.

Furthermore, the impact type fastening tool may further comprise a mode selection element, and the control device may further comprise a mode selection element state detecting module; and before the starting-up detecting and judging step, a step for detecting the state of the mode selection element via the mode selection element state detecting module may be executed. When the mode selection element is in a first state, the impact type fastening tool may be controlled to operate in a continuous impact mode in which the motor is controlled to stop only when the main switch is released; and when the mode selection element is in a second state, the impact type fastening tool may be controlled to operate in a discontinuous impact mode and to begin executing the starting-up detecting and judging step.

The impact type fastening tool and control method according to the descriptions which follow perform fuzzy judgment for impacts by detecting the current to control automatic stop of the motor in the discontinuous impact mode, do not require precise detection of impact times or the impact of the first time, and do not increase an additional direct impact detection mechanism, and presents a simple structure having a lower cost of manufacture. Furthermore, the motor, before automatic stop, can provide a constant pretension for the fastener, thereby effectively avoiding damages to the surface of the workpiece or the fastener.

DETAILED DESCRIPTION

Specific, exemplary embodiments of an impact type fastening tool will now be described in more detail with reference to the figures.

Figure 1:
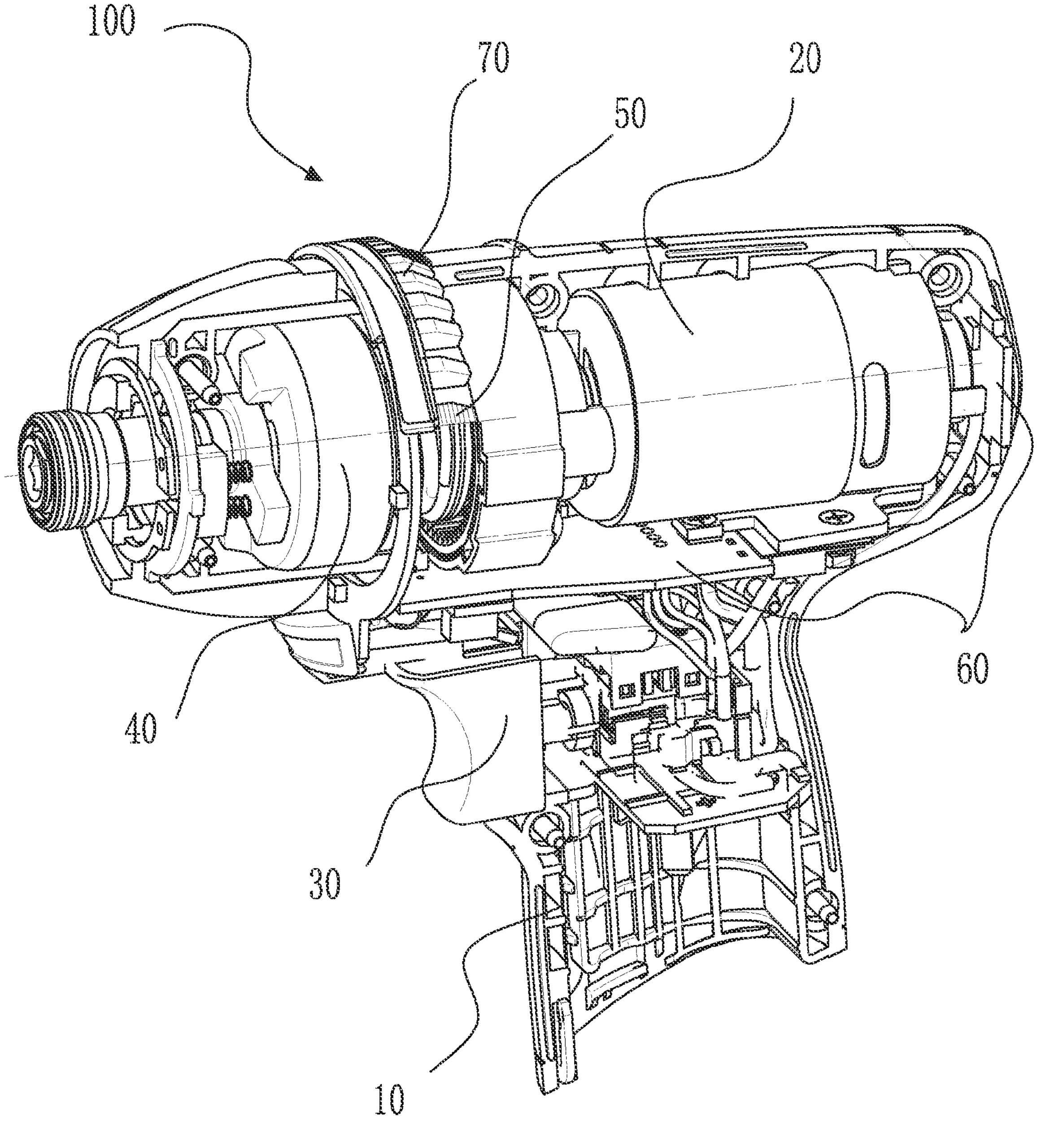
FIG. 1 is a schematic view of an exemplary impact type fastening tool constructed according to the description which follows.

Referring to FIG. 1, an exemplary impact type fastening tool 100 comprises a housing 10, a motor 20 received in the housing 10, a main switch 30 for controlling ON and OFF operations of the motor 20, an impact mechanism 40 connected to the motor 20, a mode selection element 50, a control device 60 and a stage setting element 70 for selecting an output stage of the tool. The mode selection element 50 and the stage setting element 70 may be constructed as a sliding switch, a dial, a button, or the like which is well known to those skilled in the art. The mode selection element 50 has a first state and a second state. In the first state, the control device 60 controls the impact type fastening tool 100 to operate in a continuous impact mode; and in the second state, the control device 60 controls the impact type fastening tool 100 to operate in a discontinuous impact mode. Before use, an operator may set the state of the mode selection element 50 on his own.

Figure 2:
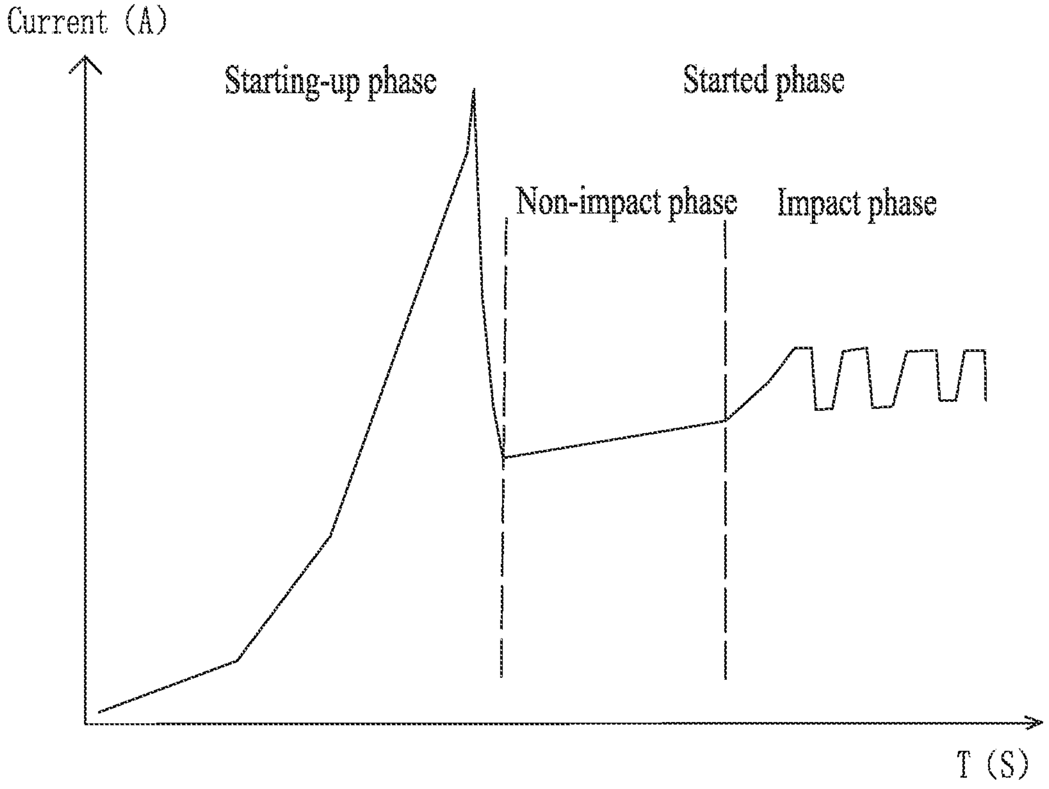
FIG. 2 is a schematic view showing changes of current when the impact type fastening tool operates.

Referring to FIG. 2, according to changes of the current when the impact tool operates, its operation procedure may be divided into a starting-up phase and a started or operational phase, wherein the started phase is further divided into a non-impact phase and an impact phase. In the starting-up phase, a travel of the main switch increases swiftly; due to instantaneous short-circuiting effect of the motor, the current increases rapidly to reach a relatively large starting-up current peak, and then falls rapidly to an intermediate value. Upon completion of the starting-up phase, the travel of the main switch substantively remains constant, and the tool comes into a non-impact phase. In the non-impact phase, the current substantially remains constant if there's no-load, and tends to rise linearly as the load increases if loaded, the current changes slowly to fit a current curve y=Kx+B (y-current, x-time). When the load reaches a threshold, the tool proceeds to the impact phase, the impact mechanism undergoes a procedure of continuous striking and disengagement, in which the machine is jammed at the moment when the impact mechanism strikes, and the impact mechanism disengages after a short period of time. During this procedure, the current varies in a serrated shape and in a change rule of high-low-high-low in short time periods.

Figure 3:
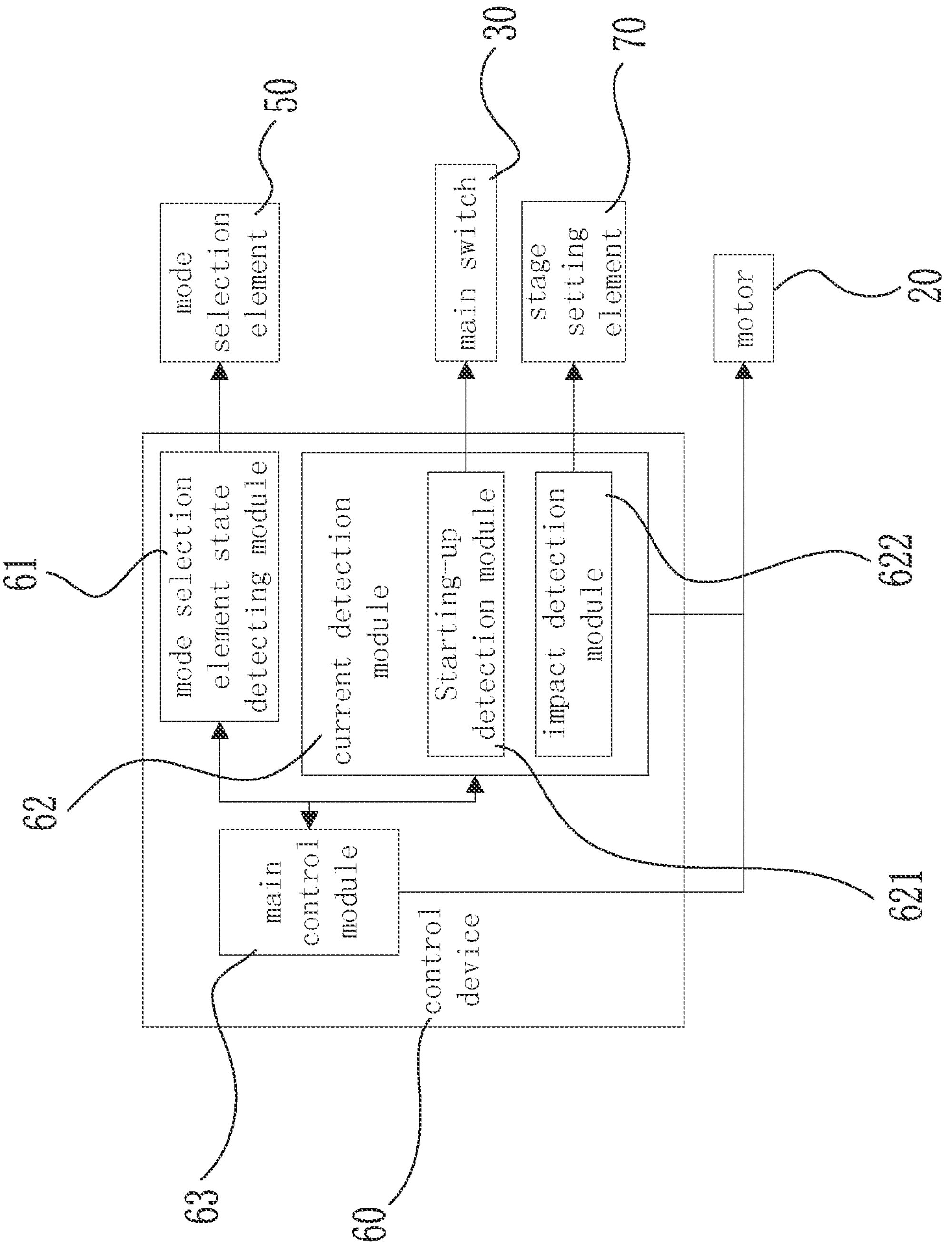
FIG. 3 is a schematic view of an exemplary control module of the impact type fastening tool constructed according to the description which follows.

Referring to FIG. 3, the control device 60 comprises a mode selection element state detecting module 61, a current detecting module 62 and a main control module 63. The main control module 63 is connected to the mode selection element state detecting module 61 and the current detecting module 62 respectively. The mode selection element state detecting module 61 is configured to detect a state of the mode selection element 50, namely, a tool operation mode selected by the operator. The current detecting module 62 is configured to detect the phase of the operation procedure of the impact type fastening tool 100. The main control module 63 controls the motor 20 according to the signal detected by the mode selection element state detecting module 61 and the current detecting module 62.

Figure 4:
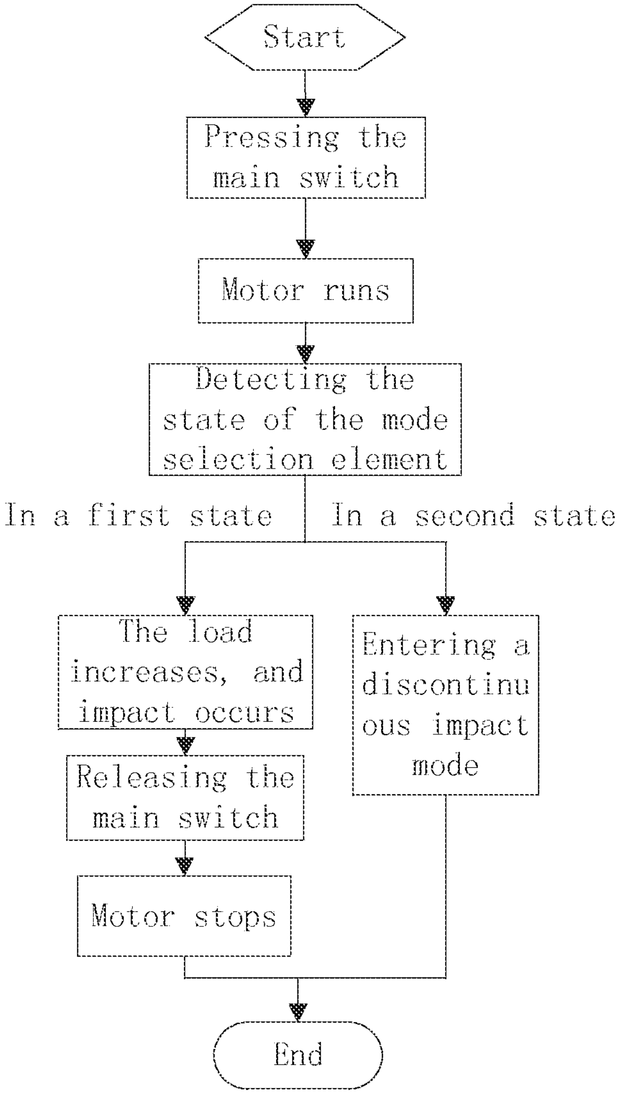
FIG. 4 is a flow chart of an operation procedure of the impact type fastening tool according to the description which follows.

Turning to FIG. 4, the impact type fastening tool 100 operates in the following procedure: after the operator presses the main switch 30, the motor 20 begins to run, the mode selection element state detecting module 61 detects the state of the mode selection element 50: if in the first state, the tool enters an ordinary continuous impact mode, and the impact mechanism 40 begins to impact as the load increases until the operator releases the main switch 30 whereupon the main control module 63 controls the motor 20 to stop; if in the second state, the tool enters the discontinuous impact mode. In the discontinuous impact mode, if the impact mechanism 40 does not impact, the motor 20 rotates constantly, and if the impact mechanism 40 impacts, the main control module 63 controls the motor 20 to automatically stop in a preset time period after occurrence of impact. It may be appreciated that the impact type fastening tool 100 may only have the discontinuous impact mode, and the mode selection element 50 and the mode selection element state detecting module 61 would then be both omitted. After the operator presses the main switch 30, the motor 20 begins to run and then the tool directly enters the discontinuous impact mode.

Figure 5:
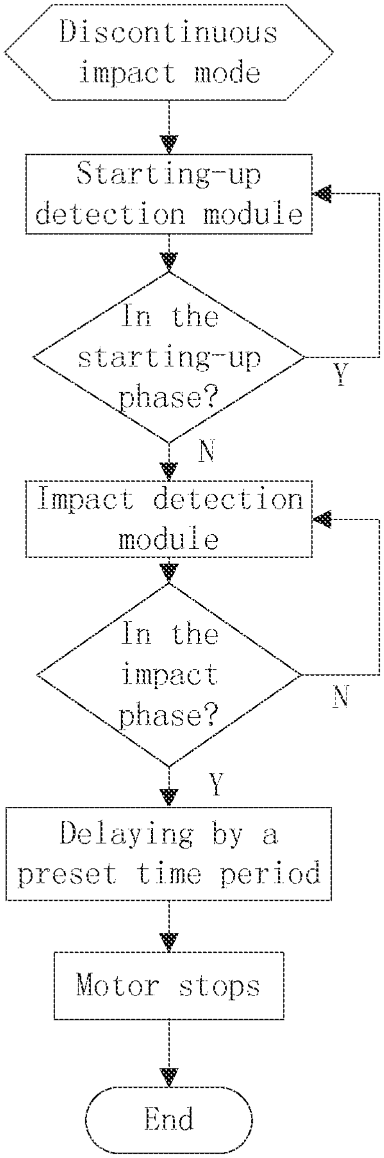
FIG. 5 is a flow chart of an operation procedure of the impact type fastening tool according to the description which follows in a discontinuous impact mode.

Referring to FIG. 5, the current detection module 62 comprises a starting-up detection module 621 for detecting the starting-up state and an impact detection module 622 for detecting the impact state after the impact type fastening tool 100 completes the starting-up operation, and the main control module 63 can judge whether the impact type fastening tool 100 completes the starting-up operation according to the signal detected by the starting-up detection module 621, and judge whether the impact mechanism 40 impacts according to the signal detected by the impact detection module 622.

An exemplary control method for the impact type fastening tool comprises the following steps:

a starting-up detecting and judging step for judging whether the impact type fastening tool completes the starting-up operation according to the signal detected by the starting-up detection module;

an impact detecting and judging step for judging whether the impact mechanism performs an impact according to the current signal detected by the impact detection module after the starting-up operation is completed; and a step for controlling the motor to stop, wherein the main control module controls the motor to automatically stop in a preset time period after the impact occurs.

It may be appreciated that before the starting-up detecting and judging step, there may be a step for detecting the state of the mode selection element through the mode selection element state detecting module. When the mode selection element is in the first state, the impact type fastening tool is controlled to operate in the continuous impact mode, and the motor is controlled to stop only when the main switch is released; and when the mode selection element is in the second state, the impact type fastening tool is controlled to operate in the discontinuous impact mode and begins to execute the starting-up detection and judging step.

By way of further example, the operation procedure in the discontinuous impact mode is preferably as follows: first, the procedure starts with a starting-up detection module 621 which judges whether the tool is in the starting-up phase or started phase according to the detected signal: if the tool is in the started phase (not in the starting-up phase), the procedure enters an impact detection module 622; if in the starting-up phase, the procedure will return to continue to perform starting-up detection; after the procedure enters the impact detection module 622, it is judged whether the tool is in the non-impact phase or the impact phase according to the detected signal: if in the impact phase, the main control module 63 controls the motor 20 to automatically stop after a preset time period; and if in the non-impact phase (not in the impact phase), the procedure returns to continue to perform impact detection.

Figure 6:
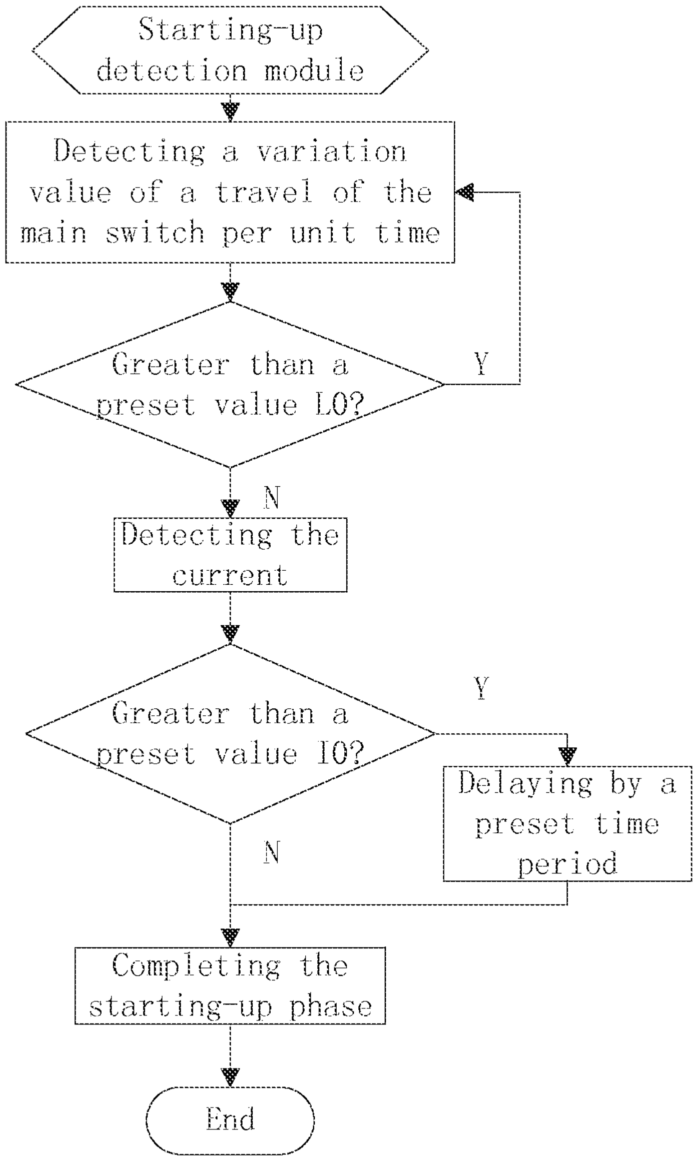
FIG. 6 is a flow chart of an operation procedure of a starting-up detection module of the impact type fastening tool according to the description which follows.

Referring to FIG. 6, when the travel of the main switch changes swiftly in the starting-up phase, the current flowing through the motor also changes greatly to an extent close to or identical with the changes of the current after occurrence of the impact, so they need to be distinguished from each other. After the control device 60 samples the amount of the travel of the main switch through AD conversion, the number of digits in a corresponding program is set, for example, 8-bit AD conversion is employed; and after the amount of the travel of the main switch 0-Max is sampled, the number of digits in the corresponding program is set as 0-255. The starting-up data is analyzed by testing, and a variation value of the travel of the main switch per unit time is set as L0, namely, a preset value of variation of the number of digits in the program per unit time. For example, the variation value of the travel of the main switch at an interval of unit time 100 us is L0=5. If the variation value of the travel of the main switch per unit time detected by the starting-up detection module 621 is greater than the preset value L0, it is judged that the tool is in the starting-up phase and the procedure returns to continue to detect the variation value of the travel of the main switch per unit time; and if the variation value of the travel of the main switch per unit time detected by the starting-up detection module 621 is smaller than the preset value L0, the current flowing through the motor 20 is detected. The impact type tool has a larger starting-up current in the starting-up phase due to the instantaneous short-circuiting effect of the motor. For example, a maximum starting-up current of a 18V-impact type tool can reach 90 A when the starting-up time is less than 0.2 S, the working current in a no-load case after the completion of the starting-up phase is only about 6 A, the current at the outset of work but without occurrence of impact is 6-12 A, and the current after occurrence of impact will leap in a range of 12-20 A in an approximately serrated shape. Hence, a current value I0, for example 25 A, is preset between the maximum current value after occurrence of impact and the current peak in the starting-up phase. If the detected current is smaller than the preset value I0, it is judged that the starting-up phase is completed; and if the current is greater than the preset value I0, it is believed that the starting-up phase will be completed after a delay of the preset time period.

Figure 7:
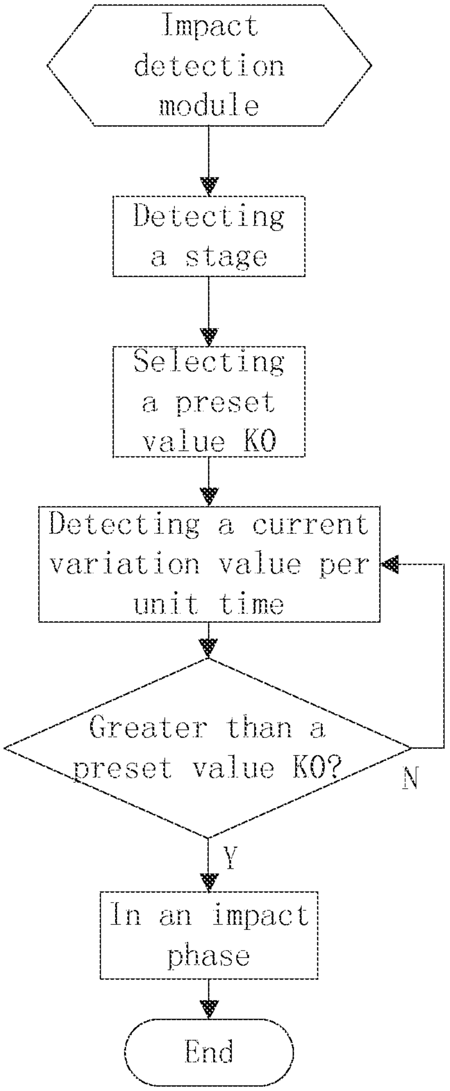
FIG. 7 is a flow chart of an operation procedure of an impact detection module of the impact type fastening tool according to the description which follows.

Referring to FIG. 7, when the impact has not occurred, the current tends to rise linearly but the curve slope is smaller, and after occurrence of impact, the current changes in an approximately serrated shape and the curve slope per unit time is larger. Therefore, the current per unit time is differentiated respectively in the non-impact phase and the impact phase to obtain the current variation value K1 and K2 per unit time. A value K0 is preset between the K1 and K2 value. For example, the current variation value at an interval of unit time 100 us is K0=5 A. When the current variation value per unit time detected by the impact detection module 622 is greater than K0, it is judged that the tool is in the impact phase, and when the current variation value per unit time detected by the impact detection module 622 is smaller than K0, it is judged that the tool is in the non-impact phase (not in the impact phase), and the procedure returns to continue to detect the current variation value per unit time. Since the output at different stages causes various change rate of the current, a different K0 may be set according to different stages. For example, K0 is set to be 3 A upon output at a minimum stage, and K0 is set to be 6 A upon output at a maximum stage. After the procedure enters the impact detection module 622, the stage set by the stage setting element 70 is detected, and different preset value K0 is selected according to different stages, and then the current variation value per unit time is detected for judgment. The current variation value per unit time is detected by the impact detection module 622 in a way that a current value I1 is detected at a time point T1, a current value I2 is detected at a time point T2, and D-value of the time points T1, T2 may be ms level or us level, the value of K is solved by bringing the two groups results (T1, I1), (T2, I2) into the equation $y=Kx+B$; or solved by using the equation $K=\Delta I/\Delta t$, wherein $\Delta 1=I2-I1$, and $\Delta t=T2-T1$. The two calculation modes are both implemented by software.

The described methodologies perform fuzzy judgment for impacts by detecting the current to control automatic stop of the motor in the discontinuous impact mode, which does not require precise detection of impact times or the impact of the first time, does not increase an additional direct impact detection mechanism, and presents a simple structure having a lower cost of manufacture. Furthermore, the motor, before automatic stop, can provide constant pretension for the fastener, thereby effectively avoiding damages to the surface of the workpiece or the fastener.

The specific embodiments described above are only intended to illustrate the ideas and principles of the present invention, not to restrict the content of the present invention. Those having ordinary skill in the art can appreciate that besides the above preferred embodiments, the present invention also includes many other alternative or modified embodiments, which still fall within the scope of the present invention as set forth in the claims presented below.

What is claimed is:

1. An impact type fastening tool, comprising:

a housing;

a motor received in the housing;

a main switch for controlling ON and OFF operations of the motor;

an impact mechanism connected to the motor; and a control device operably coupled to the impact mechanism and motor, wherein the operation procedure of the impact type fastening tool comprises a starting-up phase and a started phase, wherein the started phase comprises a non-impact phase and an impact phase, wherein the control device comprises a current detecting module and a main control module connected to the current detecting module, and wherein the main control module determines whether the impact mechanism performs an impact according to the signal detected by the current detecting module and controls the motor to automatically stop in a preset time period after the impact mechanism performs an impact.

2. An impact type fastening tool, comprising:

a housing;

a motor received in the housing;

a main switch for controlling ON and OFF operations of the motor;

an impact mechanism connected to the motor; and a control device operably coupled to the impact mechanism and motor, wherein the operation procedure of the impact type fastening tool comprises a starting-up phase and a started phase, wherein the started phase comprises a non-impact phase and an impact phase, wherein the control device comprises a current detecting module and a main control module connected to the current detecting module, and wherein the main control module determines whether the impact mechanism performs an impact according to the signal detected by the current detecting module and controls the motor to automatically stop in a preset time period after the impact mechanism performs an impact, wherein the impact type fastening tool further comprises a mode selection element, and the control device further comprises a mode selection element state detecting module connected to the main control module, wherein the mode selection element has a first state and a second state, and the mode selection element state detecting module is configured to detect the first state or the second state of the mode selection element, and wherein, when the mode selection element is in the first state, the impact type fastening tool is operated in a continuous impact mode in which the main control module controls the motor to stop when the main switch is released and, when the mode selection element is in the second state, the impact type fastening tool is operated in a discontinuous impact mode and the main control module controls the motor to automatically stop in the preset time period after the impact mechanism performs the impact.

3. An impact type fastening tool, comprising:

a housing;

a motor received in the housing;

a main switch for controlling ON and OFF operations of the motor;

an impact mechanism connected to the motor; and a control device operably coupled to the impact mechanism and motor, wherein the operation procedure of the impact type fastening tool comprises a starting-up phase and a started phase, wherein the started phase comprises a non-impact phase and an impact phase, wherein the control device comprises a current detecting module and a main control module connected to the current detecting module, and wherein the main control module determines whether the impact mechanism performs an impact according to the signal detected by the current detecting module and controls the motor to automatically stop in a preset time period after the impact mechanism performs an impact, wherein the current detection module comprises a starting-up detection module for detecting a starting-up state, and the main control module judges whether the impact type fastening tool completes the starting-up operation according to the signal detected by the starting-up detection module.

4. The impact type fastening tool according to claim 3, wherein the current detection module further comprises an impact detection module for detecting an impact state after the impact type fastening tool completes the starting-up operation, and the main control module judges whether the impact mechanism performs the impact according to the signal detected by the impact detection module.

5. The impact type fastening tool according to claim 4, wherein the impact detection module detects a current signal of the motor, and the main control module judges whether the impact mechanism performs the impact according to a change in the current signal detected by the impact detection module.

6. A control method for an impact type fastening tool comprising a housing, a motor received in the housing, a main switch for controlling ON and OFF operations of the motor, an impact mechanism connected to the motor and a control device, wherein the control device comprises a main control module, a starting-up detection module and an impact detection module respectively connected to the main control module, and wherein the impact detection module is capable of detecting the current signal of the motor; the control method comprising executing a starting-up detecting and judging step for judging whether the impact type fastening tool completes a starting-up operation according to a signal detected by the starting-up detection module;

executing an impact detecting and judging step for judging whether the impact mechanism performs an impact according to the current signal detected by the impact detection module after the starting-up operation is completed; and executing a step for controlling the motor to stop an operation thereof, in which the main control module controls the motor to automatically stop the operation thereof in a preset time period after an impact occurs.

7. The control method for an impact type fastening tool according to claim 6, wherein the impact type fastening tool further comprises a mode selection element, and the control device further comprises a mode selection element state detecting module; and wherein before the starting-up detecting and judging step is executed, a step for detecting a state of the mode selection element via the mode selection element state detecting module is executed; and wherein when the mode selection element is in a first state, the impact type fastening tool is controlled to operate in a continuous impact mode in which the motor is controlled to stop only when the main switch is released; and when the mode selection element is in a second state, the impact type fastening tool is controlled to operate in a discontinuous impact mode and to begin to execute the starting-up detecting and judging step.

8. A control method for an impact type fastening tool comprising a housing, a motor received in the housing, a main switch for controlling ON and OFF operations of the motor, an impact mechanism connected to the motor and a control device, wherein the control device comprises a main control module, a starting-up detection module and an impact detection module respectively connected to the main control module, and wherein the impact detection module is capable of detecting the current signal of the motor; the control method comprising:

executing a starting-up detecting and judging step for judging whether the impact type fastening tool completes a starting-up operation according to a signal detected by the starting-up detection module;

executing an impact detecting and judging step for judging whether the impact mechanism performs an impact according to the current signal detected by the impact detection module after the starting-up operation is completed; and executing a step for controlling the motor to stop an operation thereof, in which the main control module controls the motor to automatically stop the operation thereof in a preset time period after an impact occurs, wherein the starting-up detecting and judging step comprises a step for detecting a variation value of a travel of the main switch per unit time; and if the variation value is greater than a preset value L0, it is judged that the tool is in a starting-up phase and the step for detecting the variation value of the travel of the main switch per unit time is caused to be executed again; and if the variation value is smaller than the preset value L0, a step for detecting the current flowing through the motor is executed; and if the detected current is smaller than a preset value I0, it is judged that the starting-up phase is completed; and if the detected current is greater than the preset value I0, the starting-up phase will be determined to be completed after a delay of the preset time period.

9. The control method for an impact type fastening tool according to claim 8, wherein the preset value L0 is a preset value of the travel variation of the main switch per unit time; and after the amount of the travel of the main switch is sampled through AD conversion, a number of digits in a corresponding program is set, and the preset value of the travel variation of the main switch per unit time is a preset value of a number variation of the digits in the program per unit time; wherein the preset value I0 is a current preset value, and the preset value I0 is arranged between a maximum current value after the impact occurs and a current peak in the starting-up phase.

10. The control method for an impact type fastening tool according to claim 9, wherein the impact detecting and judging step comprises: executing a current detecting step for detecting a current variation value of the motor per unit time; executing an impact judging step for judging that the tool is in an impact phase when the detected current is greater than a preset value K0, and for judging that the tool is in a non-impact phase when the detected current is smaller than the preset value K0, and continuing to detect the current variation value per unit time.

11. The control method for an impact type fastening tool according to claim 10, wherein the preset value K0 is a preset value of the current variation per unit time, and the preset value K0 is between the current variation value per unit time in the non-impact phase and the current variation value per unit time in the impact phase.

12. The control method for an impact type fastening tool according to claim 11, wherein the impact type fastening tool further comprises a stage setting element for selecting an output stage of the tool, and wherein before executing the current detecting step, a step for judging the preset value K0 is executed to detect an output stage set by the stage setting element and to select a corresponding preset valve K0 according to the output stage detected.

* * * * *